US006702507B2

(12) United States Patent
Wild

(10) Patent No.: US 6,702,507 B2
(45) Date of Patent: Mar. 9, 2004

(54) JOINED SYSTEM OF TWO PLASTIC COMPONENTS

(75) Inventor: René Wild, Weissenburg (DE)

(73) Assignee: Dynamit Nobel Kunststoff GmbH, Weissenburg (DE)

( * ) Notice: Subject to any disclaimer, the term of this patent is extended or adjusted under 35 U.S.C. 154(b) by 0 days.

(21) Appl. No.: 09/988,697

(22) Filed: Nov. 20, 2001

(65) Prior Publication Data

US 2002/0064423 A1 May 30, 2002

(30) Foreign Application Priority Data

Nov. 25, 2000 (DE) ......................................... 100 58 703
Sep. 27, 2001 (DE) ......................................... 101 47 725

(51) Int. Cl.$^7$ ............................................... B60Q 1/00
(52) U.S. Cl. ......................... 403/353; 403/345; 403/24; 403/410; 362/507; 15/250.2
(58) Field of Search ........................ 403/24, 52, 83–85, 403/326, 329, 331, 345, 353, 410; 362/505–507; 15/250.2

(56) References Cited

U.S. PATENT DOCUMENTS 2,533,799 A * 12/1950 Haydu ........................ 24/575.1
3,704,481 A * 12/1972 Fennell ....................... 15/250.1
4,027,453 A *  6/1977 Bridge ........................ 403/353
6,318,883 B1 * 11/2001 Sugiyama et al. ........... 362/267

* cited by examiner

Primary Examiner—Lynne H. Browne
Assistant Examiner—Michael P. Ferguson
(74) Attorney, Agent, or Firm—Antonelli, Terry, Stout & Kraus, LLP

(57) ABSTRACT

A separable, form-fitting joint (5) is proposed in which one plastic component is designed as a base component (6) and another component, a cover (7), is designed as a component to be mounted on the base component (6), and the cover (7) is equipped, as viewed from the mounting direction (10), with opposing pocket-shaped receptacles (13, 14, 20, 21) which are formed on cover (7) by tongues (16, 17, 22, 23) on the cover (7) and which accommodate the insertion of flange-shaped edge sections (9, 12) of the base component (6).

9 Claims, 2 Drawing Sheets

JOINED SYSTEM OF TWO PLASTIC COMPONENTS

BACKGROUND OF THE INVENTION

The invention relates to the joining of two plastic components to form a separable form-fitting joint.

When two plastic components are joined to form a permanent integral joint by means of ultrasonic welding or a form-fitting joint by means of ultrasonic riveting, the joining method may result in changes on the surface of the joined workpieces which degrade their appearance. For example, the locations of the joints may become clearly delineated after the joined components are painted. The process of fitting the components together before welding requires that the components be precisely positioned in a way which is difficult to maintain since the components may shift relative to one another. With welded joints, if one component is defective all the components must be replaced—a characteristic which generates unnecessary costs. In addition, the process of welding workpieces requires additional machines and tools.

SUMMARY OF THE INVENTION

The object of the invention is to simplify the joining of plastic components while at the same time ensuring the integrity of the surface.

This object is achieved by means of the characterizing features of the first claim. Advantageous embodiments of the invention are claimed in the dependent claims.

According to the invention, the joining of two plastic components is achieved by designing the one plastic component as a base component and the other component as a component to be mounted on the base component, which mounting component forms a form-fitting joint with the latter of the following type: the mounting component, here designated as a cover, is equipped with opposing, pocket-shaped receptacles, as viewed from the mounting direction, called pockets herein, which are formed by tongues on the cover and which accommodate the insertion of flange-shaped edge sections of the base component, called flanges herein. Only one pocket may be provided on each side. In an advantageous feature, especially with regard to the strength of the joint and to the geometry of the edges of the base component, there are provided on the cover at least two pockets on opposing sides in the mounting direction, spaced closely together.

In order to create a joined system between the mounting component, the cover, and the base component, the flanges of the base component must be inserted into the pockets of the cover. To join the two components, there is provided a mounting direction which points away from one anterior end of the base component with one flange in the direction of the opposite posterior end with one flange. To allow the cover to be mounted on the base component, the anterior flange is extended, as viewed from the mounting direction, by at least the width of the posterior flange, and the pockets of the cover associated with the anterior flange of the base component are recessed beyond the width of the anterior flange of the base component by at least the width of the posterior flange. The distance between the bottom of the anterior pockets and the edges of the tongues of the opposing posterior pockets is at least slightly greater than the distance on the base component between the edges of the flanges.

To create the joined system of the two plastic components in the intended manner, the cover is first placed on the base component such that, when viewed from the mounting direction, the anterior flange of the base component comes to rest in front of the cover pockets associated with the flange. When mounting occurs in the mounting direction, this flange is inserted into the pockets.

When the anterior flange has been inserted down to the bottom of the pockets, the opposing pockets have slid so far beyond the posterior flange of the base component that the edge of the posterior base component flange has come to rest in front of openings of the cover pockets associated with it. After the cover is moved back against the mounting direction, the posterior flange of the base component also slides into its associated pockets, thereby securing the cover in a form-fitting manner to the base component.

In one advantageous embodiment of the invention, the base component has ribs which the pocket tongues abut during mounting. Their function is to position the cover on the base component. When the cover is moved back against the mounting direction to create the joined system, the posterior flange of the base component slides under the tongues of the pockets. As this occurs, the pocket tongues abut the ribs located in the posterior section of the base component and position the cover.

In another advantageous embodiment of the invention, the anterior pockets on the cover as viewed from the mounting direction are designed to each have a spring element which is formed from the tongue of the pocket and presses against the rib on the base component. When the cover is mounted, the spring elements immediately press against the rib on the anterior section of the base component and are tensioned. In the mounted condition, the spring elements continue to press against the flange of the base component and thus remain under tension. The result is that the cover is retained in its proper position without the requirement of a permanent joint to connect the two components.

To remove the cover, it is moved far enough in the mounting direction against the springs that the tongues of the posterior pockets release the flange of the base component. After the cover is lifted to the point where the tongues lie above this flange and the cover is moved in the direction opposite the mounting direction, the anterior pockets then also release the anterior flange of the base component, thereby allowing the cover to be lifted off the base component and replaced by another component without any damage being incurred by the base component and cover.

BRIEF DESCRIPTION OF THE DRAWINGS

The invention is further elucidated by an embodiment which shows a covering for a headlight cleaning system in the bumper of a motor vehicle.

DETAILED DESCRIPTION OF THE PREFERRED EMBODIMENTS

Figure 1:
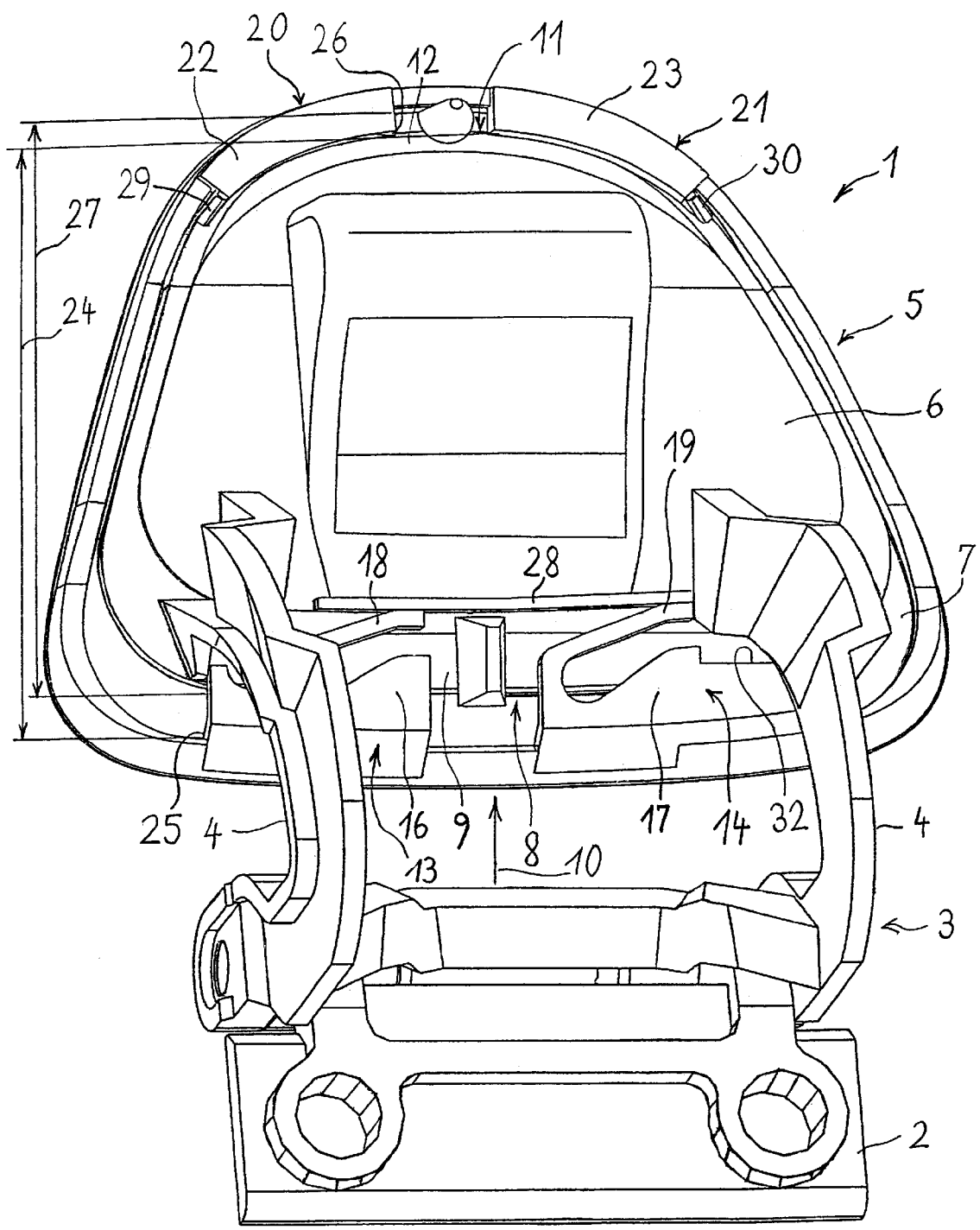
FIG. 1 shows the joined system of a base component and a cover in the assembled state.

FIG. 1 shows a joined system of two plastic components in the form of a cover 1 for a headlight cleaning system in the bumper of a motor vehicle. Located on one component 2 associated with the bumper, there is a mechanism 3 which permits the opening and closing of a closure device 5 via two pivot levers 4. Closure device 5 consists of a base component 6 which is integrated as one piece with pivot levers 4 and with a component forming the cover 7 mounted on base component 6.

As viewed from mounting direction 10 of cover 7, base component 6 has a wide flange 9 at its anterior end 8 where pivot lever 4 is attached, which flange narrows in thickness from here to its edge. Located on the opposite posterior end 11 of base component 6 is a narrower flange 12. Anterior flange 9 is deeper than its own width by the width of posterior flange 12.

At its anterior end 8, cover 7 has two pockets 13 and 14 as viewed from mounting direction 10. These are formed by the tongues 16 or 17 which are molded on to cover 7. Their function is to receive anterior flange 9. Each tongue 16 and 17 is designed such that it possesses one spring element 18 or 19, respectively, which forms an elastic continuation of the tongue.

Figure 2:
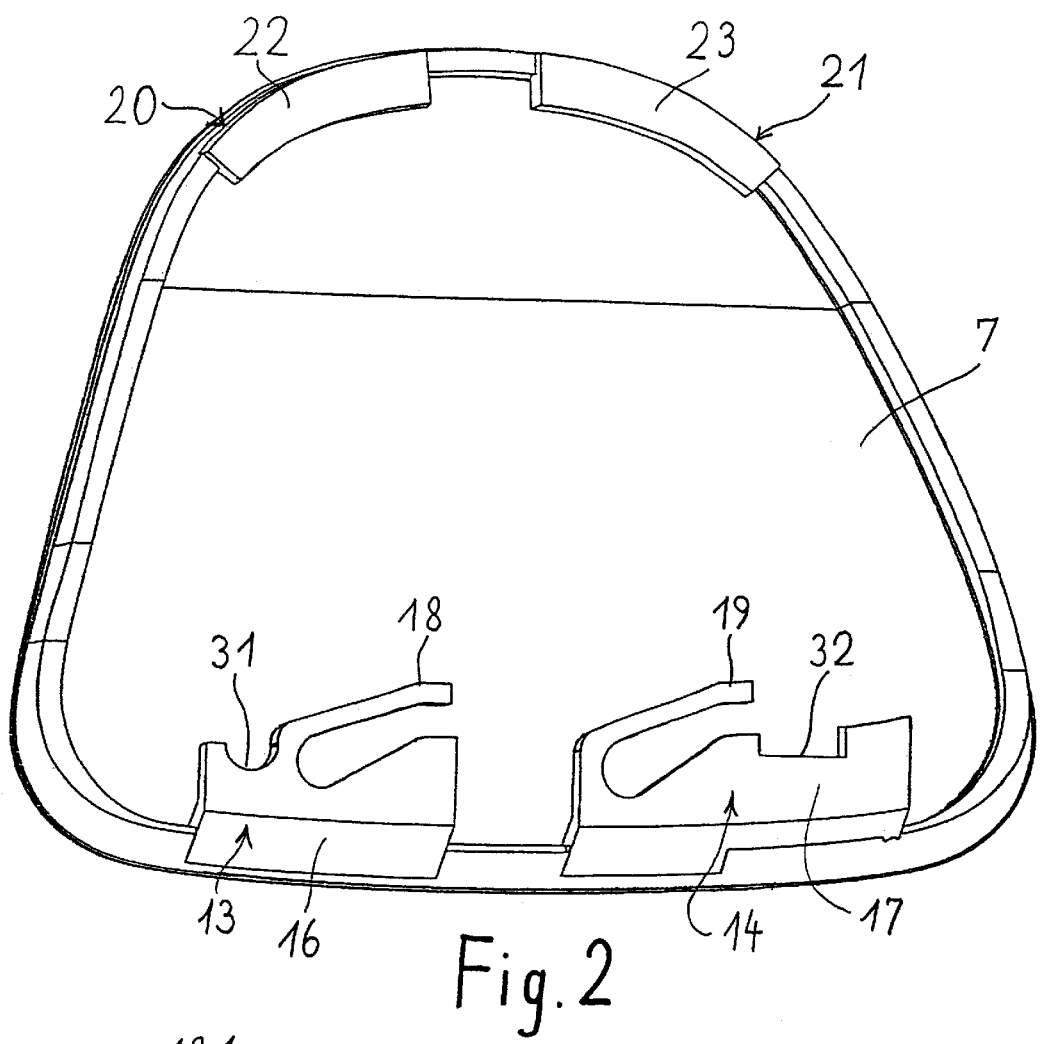
FIG. 2 shows the cover as a single component.

As viewed from mounting direction 10, there are also located two pockets 20 and 21 at the posterior end 11 of cover 7 into which flange 12 is inserted. These pockets are also formed from two molded-on tongues 22 and 23. FIG. 2 shows the cover as a single component to better illustrate the construction of cover 7.

It is evident from FIG. 1 that pockets 13 and 14 associated with anterior flange 9 of base component 6 are deeper beyond the width of anterior flange 9 by at least the width of posterior flange 12.

The distance 24 between the bottom 25 of anterior pockets 13 and 14 and the edges 26 of tongues 22 and 23 of pockets 20 or 21 is slightly greater here than the distance 27 between the edges of flanges 9 and 12.

If cover 7 is now placed on base component 6 such that tongues 16 and 17 of pockets 13 or 14 rest, as viewed from the mounting direction 10, in front of flange 9, and cover 7 is then mounted on base component 6, flange 9 slides into pockets 13 and 14. Pockets 20 and 21 which initially rested on base component 6, slide over posterior end 11 beyond flange 12 which thus comes to rest in front of pockets 20 and 21. In the process, spring elements 18 and 19 abut flange 28 on base component 6, which flange is provided in order to position cover 7 and place it under tension.

When cover 7 is moved back against mounting direction 10, tongues 22 and 23 engage flange 12 such that the insertion of flange 12 into pockets 20 and 21 results in a joined system of cover 7 with base component 6.

To prevent any lateral displacement of the cover relative to the base component, two ribs 29 and 30 are located on the posterior end 11 of base component 6, against which ribs tongues 22 and 23 of pockets 20 or 21 rest when cover 7 is in the final position.

The illustration of cover 7 shown in FIG. 2 shows that tongue 16 of pocket 13 and tongue 17 of pocket 14 each have a recess 31 or 32. When cover 7 is mounted on base component 6, these recesses 31 and 32 allow cover 7 to move in mounting direction 10 against pivot lever 4 to a point where tongues 22 and 23 of pockets 20 or 21 are able to slide beyond flange 12 on the posterior end 11 of base component 6.

Figure 3:
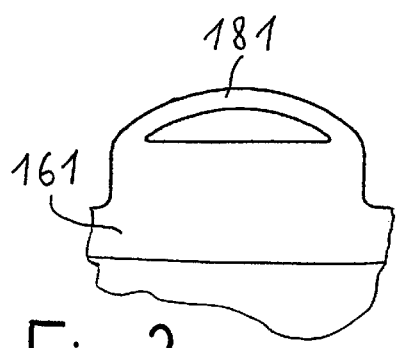
FIGS. 3, 4 and 5 show variations of the spring elements on the pocket tongues.
Figure 4:
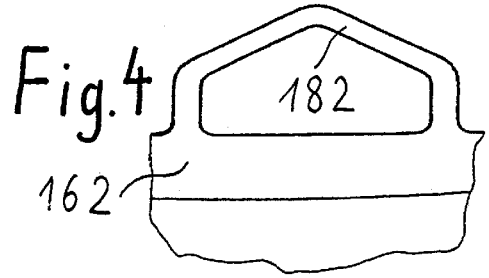
Figure 5:
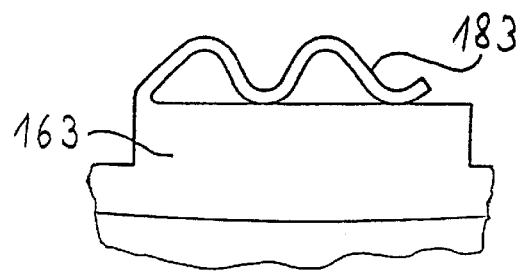

FIGS. 3, 4 and 5 shown possible variants of the spring elements on the pocket tongues of cover 7. In FIG. 3, a tongue 161 is further modified to form a bow-shaped spring element 181, while in FIG. 4 a tongue 162 includes a loop 182 which, due to its shape, is more elastic than that shown in FIG. 3. The spring element 183 on tongue 183 in FIG. 5 is a further modification of tongues 18 and 19 shown in FIGS. 1 and 2. Based on its double support on one rib, it offers an improved positioning feature for the cover and a better distributed pressing force, and thus retaining force.

What is claimed is:

1. Joined system of two plastic components to form a separable, form-fitting joint, characterized in that:

one plastic component is designed as a base component and the other component is designed as a mounting component to be mounted on the base component;

the mounting component comprises a cover equipped with opposing anterior and posterior pockets which are formed on the cover by tongues and the function of which is the insertion of flange-shaped edge sections of the base component, openings of the anterior pockets facing openings of the posterior pockets;

to join the two components a mounting direction is provided which points from one anterior end of the base component with an anterior flange towards an opposing posterior end with a posterior flange spaced from the anterior flange in the mounting direction;

on the base component, as viewed from the mounting direction, the anterior flange is extended by at least the width of the posterior flange;

anterior pockets of the cover associated with the anterior flange are recessed beyond the width of the anterior flange by at least the width of the posterior flange;

the distance between the bottom of the anterior pockets and the edges of posterior tongues of opposing posterior pockets is at least slightly greater that the distance between the edges of the flanges themselves on the base component;

the cover is first placed on the base component such that, as viewed from the mounting direction, the anterior flange rests in front of the anterior pockets of the cover associated with said anterior flange;

after insertion of the anterior flange down to the bottom of the anterior pockets, the opposing posterior pockets have slid far enough beyond the posterior flange that the edge of the posterior flange rests in front of the openings of the posterior pockets associated with said posterior flange;

after moving the cover against the mounting direction, the posterior flange of the base component has also slid into the posterior pockets associated with said posterior flange; and the cover is secured in a form-fitting manner on the base component.

2. Joined system according to claim 1, characterized in that the base component includes ribs which the tongues of the pockets abut upon mounting in order to position the cover on the base component.

3. Joined system according to claim 1, characterized in that, as viewed from the mounting direction, the anterior pockets on the cover are each equipped with a spring element which is formed from the tongue of the pocket, that a rib is provided on the base component, and that the spring elements press against this rib to secure the cover on the base component.

4. Joined system according to claim 1, characterized in that the spring elements form an elastic continuation of the tongues.

5. Joined system according claim 1, characterized in that the base component and the cover mounted on the base component form a common cover for a headlight cleaning system in a bumper of a motor vehicle.

6. A joined system of two plastic components to form a separable, form-fitting joint, comprising:

a base component having at least an anterior flange and a posterior flange spaced from one another in a mounting direction which points from the anterior flange to the posterior flange, the anterior flange being extended in the mounting direction by at least the width of the posterior flange;

a mounting component mounted on the base component, the mounting component comprising a cover, at least one anterior pocket provided on the cover into which the interior flange of the base component is inserted when the base and mounting components are joined, and at least one posterior pocket provided on the cover into which the posterior flange of the base component is inserted when the base and mounting components are joined, the at least one anterior pocket and the at least one posterior pocket having openings spaced from and facing one another in the mounting direction, the at least one anterior pocket being recessed greater than the width of the anterior flange by at least the width of the posterior flange, wherein the distance between a bottom of the at least one anterior pocket and an edge of the opening of the at least one posterior pocket is at least slightly greater than the distance between edges of the anterior and the posterior flange;

wherein, to join the mounting component to the base component, the mounting component is first placed on the base component such that, as viewed from the mounting direction, the anterior flange rests in front of the at least one anterior pocket of the mounting component associated with the anterior flange;

after insertion of the anterior flange down to the bottom of the at least one anterior pocket, the opposing at least one posterior pocket has slid far enough beyond the posterior flange that the edge of the posterior flange rests in front of the opening of the at least one posterior pocket associated with the posterior flange;

after moving the mounting component against the mounting direction, the posterior flange of the base component has also slid into the at least one posterior pocket associated with said posterior flange so that the mounting component is secured in a form-fitting manner on the base component.

7. Joined system according to claim 6, characterized in that, as viewed from the mounting direction, the at least one anterior pocket on the cover is equipped with a spring element which is formed from a tongue of the pocket, that a rib is provided on the base component, and that the spring element presses against this rib to secure the cover on the base component.

8. Joined system according to claim 7, characterized in that the spring element forms an elastic continuation of the tongue.

9. Joined system according claim 6, characterized in that the base component and the cover mounted on the base component form a common cover for a headlight cleaning system in a bumper of a motor vehicle.

* * * * *